United States Patent [19]

Hähnsen et al.

[11] Patent Number: 5,108,835

[45] Date of Patent: Apr. 28, 1992

[54] COEXTRUDED DOUBLE WALLED SHEET OF LINEAR POLYCARBONATE RESIN

[75] Inventors: Heinrich Hähnsen, Duisburg; Wolfgang Nising, St. Augustin; Thomas Scholl, Meerbusch; Hans-Josef Buysch, Krefeld; Ulrich Grigo, Kempen, all of Fed. Rep. of Germany

[73] Assignee: Bayer Aktiengesellschaft, Leverkusen, Fed. Rep. of Germany

[21] Appl. No.: 687,705

[22] Filed: Apr. 18, 1991

Related U.S. Application Data

[63] Continuation of Ser. No. 414,989, Sep. 29, 1989, abandoned, which is a continuation-in-part of Ser. No. 271,808, Nov. 15, 1988, abandoned.

[30] Foreign Application Priority Data

Nov. 24, 1987 [DE] Fed. Rep. of Germany ....... 3739765

[51] Int. Cl.⁵ ............................................. B32B 27/36

[52] U.S. Cl. .................................. 428/334; 428/412; 264/176.1; 264/171

[58] Field of Search ................... 428/412, 334; 524/94

[56] References Cited

U.S. PATENT DOCUMENTS

| | | | |
|---|---|---|---|
| 4,681,905 | 7/1987 | Kubota et al. | 524/91 |
| 4,684,680 | 8/1987 | Kubota et al. | 524/91 |
| 4,948,666 | 8/1990 | Paul et al. | 428/412 |

FOREIGN PATENT DOCUMENTS

| | | |
|---|---|---|
| 146360 | 11/1972 | Czechoslovakia . |
| 0110221 | 6/1984 | European Pat. Off. . |
| 180993 | 5/1986 | European Pat. Off. . |
| 1670951 | 2/1971 | Fed. Rep. of Germany . |
| 62-146951 | 6/1987 | Japan . |

Primary Examiner—P. C. Sluby
Attorney, Agent, or Firm—Joseph C. Gil; Aron Preis

[57] ABSTRACT

The invention relates to a process for coating moldings via co-extrusion with a UV-absorber-containing layer containing special dimeric UV absorbers and to the moldings coated with a corresponding layer.

6 Claims, No Drawings

COEXTRUDED DOUBLE WALLED SHEET OF LINEAR POLYCARBONATE RESIN

This application is a continuation of application Ser. No. 07/414,989, filed Sep. 29, 1989, now abandoned, which is a continuation-in-part application of U.S. application Ser. No. 271,808, filed Nov. 15, 1988 now abandoned.

This invention relates to a process for coating moldings of thermoplastic plastics with a co-extruded, 5 μm to 100 μm and preferably 20 μm to 50 μm thick layer of thermoplastic plastics, characterized in that the layer contains from 0.1% by weight to 20% by weight, preferably from 2% by weight to 15% by weight and more preferably from 5% by weight to 10% by weight of UV absorbers corresponding to the following formula

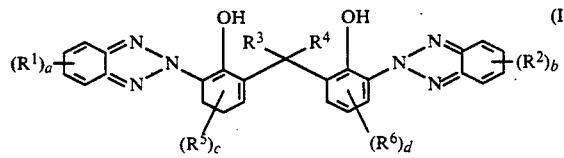

in which $R^1$ and $R^2$ may be the same or different and represent H, halogen, $C_1-C_{10}$ alkyl, $C_5-C_{10}$ cycloalkyl, $C_7-C_{13}$ aralkyl, $C_6-C_{14}$ aryl, $-OR^7$ or $COOR^7$ where $R^7$ is H, $C_1-C_{10}$ alkyl, $C_5-C_{10}$ cycloalkyl, $C_7-C_{13}$ aralkyl, $C_6-C_{14}$ aryl, $R^3$ and $R^4$ may be the same or different and represent H, $C_1-C_{15}$ alkyl, $C_5-C_6$ cycloalkyl, $C_7-C_{20}$ aralkyl or $C_6-C_{14}$ aryl, $R^5$ and $R^6$ may be the same or different and represent $C_2-C_{15}$ alkyl, $C_5-C_{10}$ cycloalkyl, $C_7-C_{20}$ aralkyl, $C_6-C_{14}$ aryl, $-OR^7$ or $COOR^7$, a, b may be the same or different and have a value of 1, 2, 3 or 4 and c, d may be the same or different and have a value of 1, 2 or 3, with the proviso that the thermoplastic plastics are neither branched polycarbonates nor Si-containing polycarbonates.

Preferred substituents $R^1$ and $R^2$ are H, Cl and $-CH_3$, preferred substituents $R^3$ and $R^4$ are H and $C_1-C_4$ alkyl, preferred substituents $R^5$ and $R^6$ are $C_4-C_8$ alkyl, cyclohexyl, $C_7-C_9$ aralkyl, phenyl and naphthyl and the preferred value for a, b, c and d is 1.

Preferred compounds I are those in which $R^1$ and $R^2$ represent H, $R^3$ and $R^4$ represent H or $CH_3$, $R^5$ and $R^6$ represent $C_4-C_8$ alkyl or $C_7-C_9$ aralkyl and a, b, c and d have a value of 1.

It is possible to use both a single UV absorber and also several UV absorbers of formula I in admixture with one another.

The present invention also relates to the coated moldings obtainable by the process according to the invention.

In addition, the invention relates to moldings of thermoplastic plastics coated with a 5 μm to 100 μm thick layer and preferably with a 20 μm to a 50 μm thick layer of thermoplastic plastics, characterized in that the layer contains 0.1% by weight to 20% by weight, preferably 2% by weight to 15% by weight and more preferably 5% by weight to 10% by weight of UV absorbers corresponding to formula I, again with the proviso that the thermoplastic plastics are neither branched polycarbonates nor Si-containing polycarbonates.

The thermoplastic plastics of which both the moldings and the protective layer consist may be of the same type or even of different types; they may even be identical. Moldings and a protective layer of plastics of the same type are particularly suitable.

Suitable thermoplastic plastics of which the moldings and/or protective layers consist of are, for example, thermoplastic aromatic polycarbonates, thermoplastic aromatic polyester carbonates, thermoplastic aromatic polyester, thermoplastic aliphatic-aromatic polyesters of iso- and/or terephthalic acid, polyvinyl chloride, polyvinylidene chloride, thermoplastic copolymers of styrene and/or methyl styrene with maleic anhydride and/or with acrylonitrile, thermoplastic graft polymers of styrene and acrylonitrile on polybutadiene rubbers, thermoplastic poly-α-olefins, such as polyethylene and polypropylene, thermoplastic polyacrylates and polymethacrylates, which may optionally be modified, and polystyrenes and blends consisting of any combination of the above-mentioned thermoplasts and of polystyrene with polyphenylene oxide.

Preferred thermoplastic plastics are thermoplastic, linear, Si-free polycarbonates. Other preferred thermoplastic plastics are thermoplastic, aromatic, Si-free polyester carbonates, thermoplastic aromatic polyesters, aliphatic-aromatic polyesters of iso- and/or terephthalic acid and also blends of the above-mentioned thermoplasts suitable for the process according to the invention, such as for example blends of polycarbonates from 2,2-bis-(4-hydroxy-3,5-dimethylphenyl)-propane and copolymers of styrene and acrylonitrile.

The thermoplastic plastics mentioned above are known or may be obtained by known methods.

Suitable molding/protective layer combinations are shown for example in Table 1 below:

TABLE 1

| | Molding | | | |
|---|---|---|---|---|
| a) | Protective layer | $PC_{linear}$ | | |
| | | $PC_{linear}$ | | |
| | Molding | $PC_{linear}$ | Apec | APE |
| b) | Protective layer | polyacrylate or PMMA or modifications thereof | | |
| | Molding | Apec | APE | |
| c) | Protective layer | $PC_{linear}$ | $PC_{linear}$ | |

PC = Si-free polycarbonate
Apec = aromatic polyestercarbonate
APE = aromatic polyester
PMMA = polymethylmethacrylate Preferred molding/protective layer combinations consist of linear, thermoplastic, aromatic polycarbonates (molding and protective layer).

The thermoplastic plastics mentioned above are known in practice and from the literature or may be obtained by methods known from the literature.

The diphenols on which the linear, Si-free polycarbonates are based are preferably diphenols corresponding to the following formula

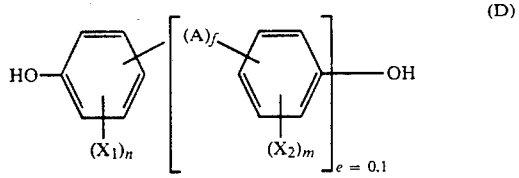

which, again, are known as such from the literature or may be obtained by methods known from the literature. In formula D, A represents $C_1$-$C_8$ alkylene, $C_2$-$C_8$ alkylidene, $C_5$-$C_{15}$ cycloalkylene or cycloalkylidene, $C_7$-$C_{18}$ aralkyl, such as for example

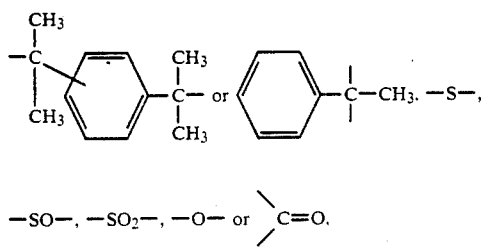

e, f independently of one another have the value 0 or 1,
$X^1$, $X^2$ may be the same or different and represent H, halogen or $C_1$-$C_4$ alkyl,
n, m independently of one another have the value 0. 1, 2, 3 or 4.

Suitable bisphenols are, for example, hydroquinone, resorcinol, 4,4'-dihydroxydiphenyl, bis-(hydroxyphenyl)alkanes, cycloalkanes, ethers, ketones, sulfoxides, sulfonates, sulfides, α,α-bis-(hydroxyphenyl)-ethylbenzene and diisopropylbenzene and also the corresponding nucleus-alkylated and nucleus-halogenated compounds.

Bisphenols containing alkyl groups may also be used in the form of the bisphenols substituted completely or partly by fluoroalkyl groups or partly by fluorinated alkyl groups, such as for example bis-(4-hydroxyphenyl)-2,2-hexafluoropropane.

Mixtures of the diphenols mentioned above may also be used.

Preferred polycarbonates are based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5dimethylphenyl)-2,2-propane (tetramethylbisphenol A), bis-(4-hydroxyphenyl)-1,1-cyclohexane (bisphenol Z), bis-(4-hydroxy-3,5-dimethylphenyl)-sulfone (dixylenolsulfone) and on trinuclear bisphenols, such as α,α-bis-(4-hydroxyphenyl)-p-diisopropylbenzene and mixtures of these compounds.

Suitable thermoplastic, aromatic polyester carbonates or thermoplastic, aromatic polyesters are synthesized from aromatic dicarboxylic acids and diphenols, at least one carbonic acid derivative, for example phosgene, additionally participating in the synthesis of the polyester carbonates.

Preferred aromatic dicarboxylic acids are, for example, isophthalic acid, terephthalic acid, diphenylether-4,4'-dicarboxylic acid, naphthalene-2,6-dicarboxylic acid. Isophthalic acid and terephthalic acid are particularly preferred. The preferred carbonic acid derivative is phosgene.

Preferred diphenols for the production of the aromatic polyesters and polyester carbonates according to the invention are compounds corresponding to the following formula:

$$HO-Z-OH \qquad (III)$$

in which Z is a difunctional mononuclear or polynuclear aromatic radical containing 6 to 30 carbon atoms, the structure of Z being such that the two OH groups are each directly attached to a carbon atom of an aromatic system.

Particularly preferred diphenols are compounds corresponding to the following formula

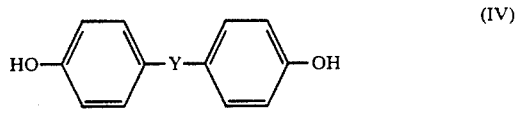

in which
Y is a single bond, a $C_1$-$C_7$ alkylene or alkylidene radical, a $C_5$-$C_{12}$ cycloalkylene or cycloalkylidene radical, $-O-$, $-S-$,

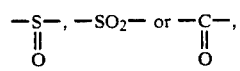

and also nucleus-alkylated and nucleus-halogenated derivatives thereof, for example hydroquinone, resorcinol, dihydroxydiphenyls, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropylbenzenes, and also nucleus-alkylated and nucleus-halogenated derivatives thereof.

The most important diphenols are bisphenol A, tetramethyl bisphenol A, 1,1-bis-(4-hydroxyphenyl)-isobutane, 1,1-bis-(4-hydroxyphenyl)-cyclohexane, 4,4'-dihydroxydiphenylsulfide, 4,4'-dihydroxydiphenylsulfone and also di- and tetrahalogenated derivatives thereof. Bisphenol A is particularly preferred. Mixtures of the diphenols mentioned may also be used.

Possible branching agents are mentioned in DE-OS 29 49 924 and 30 07 934.

Preferred chain terminators for the aromatic polyesters and polyester carbonates are phenol, alkylphenol containing $C_1$-$C_{12}$ alkyl groups, halogenated phenols, hydroxydiphenyl, naphthols, chlorocarbonic acid esters of such phenolic compounds and chlorides of aromatic monocarboxylic acids which may optionally be substituted by $C_1$-$C_{22}$ alkyl groups and halogen atoms. These chain terminators are used in quantities of 0.1 to 10 mol-% (in the case of phenols, based on acid dichloride). The chlorides of aliphatic monocarboxylic acids containing up to 22 carbon atoms are also suitable.

Where they are phenolic compounds, the chain terminators may be added to the reaction mixture before the beginning of or during the reaction. However, enough chloride and/or phosgene must still be available to ensure that they can still react and limit the chain. For example, the chain terminator may be used together with the diphenol and may be present in the solution of the chlorides of the aromatic dicarboxylic acids or may be added to the reaction mixture after preparation of a precondensate.

Where acid chlorides and chlorocarbonic acid esters are used as chain terminators, they are preferably used together with the aromatic dicarboxylic acid dichlorides and/or phosgene. These chain terminators may also be added to the reaction mixture at a time when the chlorides of the dicarboxylic acids and the phosgene have already largely or completely reacted off.

Up to 30 mol-% of the dicarboxylic acids and dihydroxy compounds may be aliphatic groups for example adipic acid, and butane-1,4-diol may be involved in the synthesis of the aromatic polyesters and polyester carbonates.

In addition, the aromatic polyesters and polyester carbonates may also be partly synthesized from aromatic hydroxycarboxylic acids, for example p-hydroxybenzoic acid. The proportion of such hydroxycarboxylic acids may be up to 100 mol-% (based on bisphenol).

Where isophthalic acid and terephthalic acid together are involved in the synthesis of the aromatic polyesters and polyester carbonates, the ratio between them may be from 1:20 to 20:1.

The aromatic polyester carbonates suitable for the purposes of the invention may contain up to 80 mol-% and preferably up to 50 mol-% carbonate groups, based on the sum of ester and carbonate groups.

Both the ester component and also the carbonate component of the aromatic polyester carbonates according to the invention may be present in the polycondensate either in the form of blocks or in statistical distribution.

The production of the aromatic polyesters and polyester carbonates is known and is described, for example, in DE-OS 14 95 626, 22 32 877, 27 03 376, 30 00 610, 29 49 924, 30 07 934. The interfacial process is particularly preferred.

The relative solution viscosity ($\eta_{rel}$) of the aromatic polyesters and polyester carbonates is in the range from 1.18 to 1.4 and preferably in the range from 1.22 to 1.3 (as measured on solutions of 0.5 g polyester or polyester carbonate in 100 ml $CH_2Cl_2$ solution at 25° C.).

The moldings to be protected in accordance with the invention are, preferably, sheets, walled sheets, profiles, walled profiles, films, window profiles and structural components of all kinds, i.e. for example lamp housings, screens, cover panels and the like. The production of moldings such as these by extrusion is known. The panels should preferably have a thickness of 0.5 mm to 30 mm.

Plastics containing UV absorbers are known (see, for example, U.S. Pat. No. 3,004,896, Kunststoffe 74 (1984), pages 620 to 623, Taschenbuch der Kunststoff-Additive, 2nd Edition, Dr. F. Gugumus, "Lichtschutzmittel für thermoplastische Kunststoffe", pages 124 et seq. and U.S. Pat. No. 2,965,578).

The co-extrusion of thermoplastic plastics is also known (see for example "Grundzüge der Coextrusion von Platten und Folien", Kunststoffberater 10 (1976), pages 538 to 541, DE-OS 28 32 676, EP-OS 0 065 619, EP-PS 0 110 221 and DE-OS 32 44 953), the coating of plastics with plastics containing UV absorbers also being described in this prior art. However, these processes are always attended by problems arising out of the potential migration of the UV absorber, above all when the co-extrusion process has to be carried out in vacuo for the production of window profiles. For this reason, it is necessary, in order to be safe, to change over to a two-layer process (cf. DE-OS 32 44 953 and EP-OS 0 110 238), although this does involve additional outlay.

Another possibility is to use polymeric UV absorbers (cf. for example DE-OS 22 31 531, DE-OS 22 31 532, EP-OS 0 141 140, DE-OS 34 24 066 and DE-OS 34 24 555). However, the use of polymeric UV absorbers has the disadvantage that incompatibility can develop between the UV absorber and the matrix to be protected.

In addition, the known polymeric UV absorbers for example are inherently UV-unstable and/or lead to embrittlement of the matrix to be protected (for example in the case of PMMA-based polymeric UV absorbers for polycarbonate).

In addition, it is known that polyacrylate or polycarbonate moldings can be coated with solutions containing UV absorbers of the same or different thermoplasts (cf. DE-OS 16 94 273). However, the disadvantage of a process such as this is that the coatings have to be dried and hardened, quite apart from the technical problems involved in handling large moldings.

It is also known that polycarbonates can be impregnated with solutions containing UV absorbers (cf. for example U.S. Pat. No. 3,617,330 and 3,892,889). This process also has the disadvantage of an additional drying step and the complicated handling of large moldings and baths.

The UV absorbers of formula (I) to be used in accordance with the invention are known (cf. for example DE-OS 16 70 951, Czech patent 146 360, EP-OS 0 180 993, EP-OS 0 180 991 and EP-OS 0 180 992).

These UV absorbers are used both in plastics (cf. DE-OS 16 70 951) and also in lacquers (cf. EP-OS 0 180 991).

The use of UV absorbers corresponding to formula I has up to now been described in four different applications. DE-OS 16 70 951 describes the use of alkylenebis-(benzotriazolylphenols) as UV absorbers in polyolefins, polyesters, PVC and polyvinylidene chloride and more especially in polyethylene, polypropylene, polycarbonate and polyvinyl chloride. EP-A 0 180 991 describes the UV stabilization of thermosetting lacquer resin compositions based on acrylate, alkyl or unsaturated polyester resins. EP-A 0 180 992 describes a stabilizer system consisting of a UV absorber of formula I and a 2,2,6,6-tetramethyl piperidine derivative for the UV stabilization of PVC, poly-α-olefins, ABS terpolymers and polyurethane resins. The fourth application is Japanese patent publication No. 62-146951.

In all four applications, the UV- and weather-stabilized compositions are prepared by mixing the UV absorber(s) with the polymers to be protected.

However, it was not obvious to apply these special UV absorbers in surface layers via co-extrusion to moldings of light-sensitive, thermoplastic plastics, because the coated moldings obtained show a surprisingly favorable combination of properties, namely low electrostatic chargeability combined with better weathering behavior than is possible by the two-layer process, even using UV absorbers corresponding to formula I. In addition to lower yellowing values, a higher toughness level is also measured, which is particularly surprising. The low electrostatic chargeability of such co-extruded moldings is also surprising. A double walled sheet of polycarbonate, coated with a 40 μm thick layer, consisting of 90 parts by weight polycarbonate and 10 parts by weight of a UV absorber corresponding to formula I ($R^{1-4}=H$, $R^{5,6}=i$-octyl, c,d=1), shows only half the electrostatic charging of uncoated polycarbonate after rubbing 50 times with a Dralon cloth.

Accordingly, the process according to the invention has the advantages over the prior art of simplified production and improved UV- and weather stabilization of large-surface thermoplastic moldings of different thickness.

Accordingly, the present invention also relates to moldings of light-sensitive, thermoplastic plastics coated with a 5 μm to 100 μm and preferably with a 20 μm to 50 μm thick layer of thermoplastic plastics, characterized in that the layer contains 0.1% by weight to 20% by weight, preferably 2% by weight to 15% by weight and more preferably 5% by weight to 10% by weight of UV absorbers corresponding to formula I, with the proviso that the thermoplastic plastics are neither branched polycarbonates nor Si-containing polycarbonates.

The UV absorbers corresponding to formula I may be incorporated in the thermoplastic plastics to be used as surface layers by standard methods, for example by mixing the UV absorbers with the granular or powder-form plastics material as such or by mixing solutions of the UV absorbers with solutions of the plastics in suitable organic solvents, such as $CH_2Cl_2$, haloalkanes, aromatic halogen compounds, chlorobenzene, xylenes, etc. The mixtures are then homogenized in known manner via extrusion. After evaporation of the solvent, the solution mixtures are, for example, compounded in known manner.

The application of the surface layers via co-extrusion in accordance with the invention takes place in known manner in known co-extrusion extruders.

A preferred co-extrusion process is, for example, the adaptor process (cf. Examples).

Both the light-sensitive thermoplastic plastics used as core layer and also the thermoplastic, but not necessarily light-sensitive plastic of the surface layer may contain the usual additives for the respective plastics, such as fillers, reinforcing materials, flameproofing agents, pigments, antistatic agents, dyes, lubricants and/or mold release agents.

They may be incorporated in the usual way.

EXAMPLES

UV absorber:

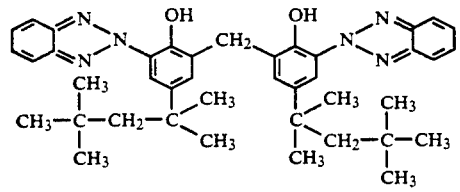

I

UV absorber used for comparison:

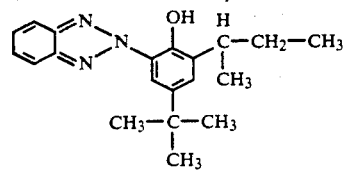

II

Production of the surface layer compounds containing UV absorber

10% by weight of the UV absorbers were incorporated in the thermoplastics in a twin-screw extruder (Werner and Pfleiderer ZSK 32) at 280° C./80 r.p.m. and the resulting extrudate granulated.

Single-layer co-extrusion of double walled sheets

The plastics sheets coated with a single layer (core layer 10 mm, surface layer 40 μm) are continuously co-extruded by the adaptor process using a sheet die. In order to prevent deformation of the still hot double-walled sheet extrudate, it is passed through a calibrator after leaving the die. Finally, the sheet is cut to the required length.

Using the UV absorber I to be used in accordance with the invention, this single-layer process may be carried out over relatively long production times without any problems either with machinery or with the product. The use of the UV absorber II leads very quickly to evaporation and deposition problems. The calibrators become blocked and/or the optical quality of the sheets is marred.

Testing

The sheets were weathered 5000 h in an Atlas weather-o-meter (Atlas, USA) using a 6.5 W xenon lamp (cycle: 102 minutes exposure and 18 minutes spraying with demineralized water with the lamp on). The maximum blackboard temperature was 60° C. ($\pm 5°$ C.). The plates were tested every 1000 h. For the simulated practical testing of toughness, a modified falling ball test developed with multiple-wall sheets in accordance with DIN 53 443 was carried out. This test measures the damage $W_s$ caused by a 5 mm diameter penetration body which is intended to produce similar biaxial stressing to a falling hailstone. At room temperature, a weight of 36 kg is dropped from a height of 0.2 m onto the test specimens resting freely on a support ring having an internal diameter of 20 mm.

The test is carried out with the weathered side of the test specimen in the compression zone. The fracture pattern FP is characterized by numbers: 1=splintered, 2=smooth break, 3=brittle, 4=tough.

The yellowness index YI is expressed as the yellowness value determined in accordance with DIN 6167.

The gloss value of the plates is determined in accordance with DIN 67 530 at an incidence angle of 60°.

In short, it may be said that the version comprising two surface layers shows favorable weathering behavior only where a migratable UV absorber is used, because only a migratable UV absorber is able to concentrate in the surface region. The version according to the invention comprising a single surface layer is easier to produce. A further improvement is obtained in gloss, yellowing and penetration resistance after weathering.

I) For the following Examples the materials used are as follows

I) 1. Linear homopolycarbonate from 2,2-bis-(4-hydroxyphenyl)-propane, having a relative viscosity of 1.3 (as measured at 25° C. on a 0.5% solution in dichloromethane) and a $\overline{M}w$ of about 30,000 and containing 0.3% by weight of UV-Absorber Tin 350 corresponding to the following formula

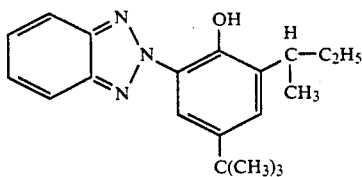

as basic stabilizer.

I) 1.1 The same product as I) 1. containing also 0.3% of Tin 350 but additionally 10% by weight of another UV-Absorber corresponding to the following formula

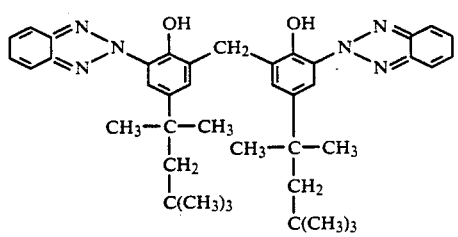

as additional stabilizer.

I) 1.2 The same product as I) 1. containing also 0.3% of Tin 350 but additionally 10% by weight of another UV-Absorber corresponding to Tin 234 of the following formula

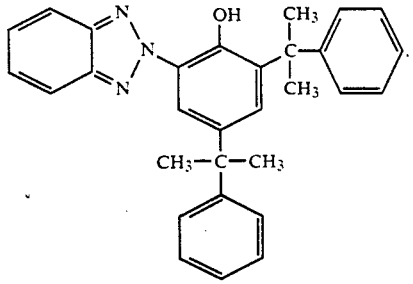

I) 2. Branched homopolycarbonate from 2,2-bis-(4-hydroxyphenyl)-propane being branched by isatinbiscresol, regulated with phenol as chain termination and having a relative viscosity of 1.31 (as measured at 25° C. on a 0.5% solution in dichloromethane) and a $\overline{M}w$ of about 30,000 and containing 0.3% by weight of UV-Absorber Tin 350 according to polycarbonate I) 1. as basic stabilizer.

I) 3. Mixture of 25% by weight of polycarbonate I) 1. containing 0.3% by weight of UV-Absorber Tin 350 as basic stabilizer and 75% by weight of polycarbonate I) 2. containing also 0.3% by weight of UV-Absorber Tin 350 as basic stabilizer.

II) Double walled sheets, thickness 10 mm
II) 1. without additional layer.
II) 1.1 Double walled sheet prepared from material I) 1.

The following testings have been made, as explained under chapter "Testing" page 15 of instant specification without weathering and after weathering,
a) for gloss at angle of 60° according to DIN 67530
b) for damage $W_s$ (units Joule),
c) for FP fracture pattern, characterized by splintered, smooth break, brittle or tough,
d) for Yellowness Index YI according to DIN 6167 and
e) for transmission $\tau_y$ (units %) measured according to DIN 50 33 and summarized in the following table:

| Double walled sheets (comparison) | gloss hours weathering | | | | damage hours weathering | | | | FP hours weathering | | | | YI hours weathering | | | | transmission hours weathering | | | |
|---|---|---|---|---|---|---|---|---|---|---|---|---|---|---|---|---|---|---|---|---|
| | 0 | 3000 | 4000 | 5000 | 0 | 3000 | 4000 | 5000 | 0 | 3000 | 4000 | 5000 | 0 | 3000 | 4000 | 5000 | 0 | 3000 | 4000 | 5000 |
| II) 1.1 | — | — | — | — | 2.6 | 0.5 | — | 0.3 | tough | — | — | brittle | 2.0 | 13.4 | — | 15.9 | 78.5 | 74.8 | — | 73 |

II) 2. Double walled sheets, thickness 10 mm with one additional layer, thickness 40 μm.

II) 2.1 Double walled sheet prepared from material I) 1. coated via coextrusion by a layer from material I) 1.1.

The following testings have been made as explained before and are summarized in the following table.

| Double walled sheet being coated by one layer (according to invention) | gloss hours weathering | | | | damage hours weathering | | | | FP hours weathering | | | |
|---|---|---|---|---|---|---|---|---|---|---|---|---|
| | 0 | 3000 | 4000 | 5000 | 0 | 3000 | 4000 | 5000 | 0 | 3000 | 4000 | 5000 |
| II) 2.1 | 121 | 119 | 124 | 121 | 2.1 | 2.8 | 2.7 | 2.4 | tough | tough | — | tough |

| Double walled sheet being coated by one | YI | transmission |
|---|---|---|

| layer (according | hours weathering | | | | hours weathering | | | |
|---|---|---|---|---|---|---|---|---|
| to invention) | 0 | 3000 | 4000 | 5000 | 0 | 3000 | 4000 | 5000 |
| II) 2.1 | 2.6 | 5.8 | 6.4 | 6.8 | 79.4 | 77.1 | 76.6 | 75.9 |

II) 2.3 Double walled sheet prepared from material I) 3. coated via coextrusion by a layer from I) 1.2.

It must be stated that this experiment cannot be made over a long time which means the results are not reproducible, because the UV-Absorber evaporates and blocks the calibrators, leads to deposition problems which influence the optical quality of the double walled sheets.

The following testings have thus been made under this provision of difficulty and are summarized as follows:

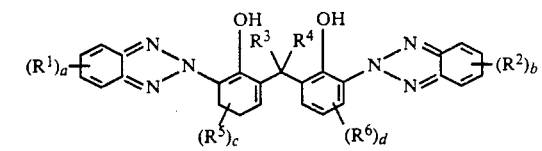

wherein
$R^1$ and $R^2$ represent H, Cl or $CH_3$,
$R^3$ and $R^4$ represent H or $C_1$-$C_4$ alkyl,

| The following testings have thus been made under this provision of difficulty and are summarized as follows: | | | | | | | | | | | | | |
|---|---|---|---|---|---|---|---|---|---|---|---|---|---|
| Double walled sheet being coated by one layer | gloss hours weathering | | | | damage hours weathering | | | | FP hours weathering | | | | |
| (comparison) | 0 | 3000 | 4000 | 5000 | 0 | 3000 | 4000 | 5000 | 0 | 3000 | 4000 | 5000 | |
| II) 2.3 | 136 | 134 | — | 134 | 2.1 | 2.5 | — | 2.4 | tough | — | — | brittle | |
| | Double walled sheet being coated by one layer | YI hours weathering | | | | transmission hours weathering | | | | | | | |
| | (comparison) | 0 | 3000 | 4000 | 5000 | 0 | 3000 | 4000 | 5000 | | | | |
| | II) 2.3 | 3.6 | 6.1 | — | 5.2 | 77.8 | 78.1 | — | 78.3 | | | | |

From the idea of the invention it is clear that the core layers may be coated on one or both sides with the surface layer according to the invention.

What is claimed is:

1. A coextruded double walled sheet comprising a core layer and a surface layer having a thickness of 5 to 100 μm wherein said surface layer contains 0.1 to 20 percent relative to its weight of a UV absorber corresponding to $R^5$ and $R^6$ represent $C_4$-$C_8$ alkyl, cyclohexyl, $C_7$-$C_9$ aralkyl, phenyl or naphthyl, and
$a = b = c = d = 1$, and
wherein said core layer and said surface layer each comprising thermoplastic linear aromatic polycarbonate resin.

2. The sheet of claim 1 wherein said surface layer contains 2 to 15 percent by weight of said UV absorber.

3. The sheet of claim 1 wherein said surface layer contains 5 to 10 percent by weight of said UV absorber.

4. The sheet of claim 1 wherein surface layer is 20 μm to 50 μm thick.

5. The sheet of claim 1 wherein surface layer contains flameproofing agents, antistatic agents, dyes, lubricants, and/or mold release agents.

6. The sheet of claim 1 wherein core layer contains fillers, reinforcing materials, flameproofing agents, pigments, dyes, lubricants and/or mold release agents.

* * * * *